(12) United States Patent
Bergeron et al.

(10) Patent No.: US 11,568,403 B2
(45) Date of Patent: Jan. 31, 2023

(54) VEHICLE TOLL TRANSPONDER FOR ENABLING MULTIPLE TRANSACTION CARDS AND SECURELY PROVIDING TRANSACTION CARD DETAILS

(71) Applicant: Capital One Services, LLC, McLean, VA (US)

(72) Inventors: George Bergeron, Falls Church, VA (US); Adam Vukich, Alexandria, VA (US); James Zarakas, Centreville, VA (US)

(73) Assignee: Capital One Services, LLC, McLean, VA (US)

(*) Notice: Subject to any disclaimer, the term of this patent is extended or adjusted under 35 U.S.C. 154(b) by 220 days.

(21) Appl. No.: 16/947,637

(22) Filed: Aug. 11, 2020

(65) Prior Publication Data

US 2022/0051239 A1 Feb. 17, 2022

(51) Int. Cl.
*G06Q 20/00* (2012.01)
*G06Q 20/40* (2012.01)
*G06Q 20/34* (2012.01)
*G07B 15/00* (2011.01)
(Continued)

(52) U.S. Cl.
CPC ........... *G06Q 20/401* (2013.01); *G06K 7/087* (2013.01); *G06Q 20/352* (2013.01); *G06Q 20/409* (2013.01); *G07B 15/00* (2013.01); *H04L 9/3234* (2013.01); *G06Q 2220/00* (2013.01); *G06Q 2240/00* (2013.01); *H04L 2209/56* (2013.01)

(58) Field of Classification Search
CPC .. G06Q 20/401; G06Q 20/352; G06Q 20/409; G06Q 2220/00; G06Q 2240/00; G06Q 20/353; G06K 7/087; G06K 7/10009; G06K 7/10425; G06K 17/0022; G06K 19/0723; G06K 7/10297; G07B 15/00; G07B 15/063; H04L 9/3234; H04L 2209/56; H04L 2209/84
USPC .......................... 705/16, 21, 59; 380/44, 262
See application file for complete search history.

(56) References Cited

U.S. PATENT DOCUMENTS

| | | | |
|---|---|---|---|
| 2002/0002534 A1* | 1/2002 | Davis | G06Q 20/10 235/379 |
| 2004/0083130 A1 | 4/2004 | Posner et al. | |
| 2005/0033688 A1* | 2/2005 | Peart | G07F 7/127 340/5.4 |

FOREIGN PATENT DOCUMENTS

| | | |
|---|---|---|
| JP | 2003162744 A | 6/2003 |
| JP | 2009015490 A | 1/2009 |

* cited by examiner

*Primary Examiner* — Dante Ravetti
(74) *Attorney, Agent, or Firm* — Harrity & Harrity, LLP

(57) ABSTRACT

A toll transponder may receive transaction card data identifying a transaction card associated with a transaction account. The toll transponder may provide to a toll server device, and via a toll antenna of a toll collection system, a request for a transaction amount for a vehicle toll, and may receive a response requesting authorization for payment of the transaction amount. The toll transponder may determine, based on the response, an authorization request cryptogram for payment of the transaction amount, and generate an encrypted signal identifying the authorization request cryptogram, the transaction card data, and a toll transponder identifier identifying the toll transponder. The toll transponder may provide the encrypted signal to the toll server device via the toll antenna, and may receive from the toll server device, via the toll antenna, data indicating whether the transaction amount for the vehicle toll is approved.

20 Claims, 10 Drawing Sheets

(51) Int. Cl.
*G06K 7/08* (2006.01)
*H04L 9/32* (2006.01)

VEHICLE TOLL TRANSPONDER FOR ENABLING MULTIPLE TRANSACTION CARDS AND SECURELY PROVIDING TRANSACTION CARD DETAILS

BACKGROUND

Tolls may be collected from vehicles based on use of roads, lanes, tunnels, bridges, and/or the like. An electronic toll collection system may collect tolls automatically at a toll station without requiring vehicles to stop to pay the toll. In this case, a vehicle may be equipped with a transponder that communicates with the toll station to identify the vehicle and cause an account of a user associated with the vehicle to be charged for the toll.

SUMMARY

According to some implementations, a method may include receiving, by a toll transponder, transaction card data identifying a transaction card associated with a transaction account. The transaction card data may be received based on physically receiving the transaction card with the toll transponder, or a contactless communication with the transaction card. The method may include providing, by the toll transponder, to a toll server device, and via a toll antenna of a toll collection system, a request for a transaction amount for a vehicle toll, and receiving, by the toll transponder, from the toll server device, via the toll antenna, and based on the request, a response requesting authorization for payment of the transaction amount for the vehicle toll. The method may include determining, by the toll transponder and based on the response, an authorization request cryptogram for payment of the transaction amount for the vehicle toll, and generating, by the toll transponder, an encrypted signal identifying the authorization request cryptogram, the transaction card data, and a toll transponder identifier identifying the toll transponder. The method may include providing, by the toll transponder, the encrypted signal to the toll server device and via the toll antenna, and receiving, by the toll transponder, from the toll server device, and via the toll antenna, data indicating whether the transaction amount for the vehicle toll is approved.

According to some implementations, a toll transponder may include one or more memories and one or more processors, to receive transaction card data identifying a transaction card associated with a transaction account. The transaction card data may be received based on physically receiving the transaction card with the toll transponder, or a contactless communication with the transaction card. The one or more processors may provide, to a toll server device and via a toll antenna of a toll collection system, a request for a transaction amount for a vehicle toll, and may receive, from the toll server device, via the toll antenna, and based on the request, a response requesting authorization for payment of the transaction amount for the vehicle toll. The one or more processors may determine, based on the response, an authorization request cryptogram for payment of the transaction amount for the vehicle toll, and may generate an encrypted signal identifying the authorization request cryptogram, the transaction card data, and a toll transponder identifier identifying the toll transponder. The one or more processors may provide the encrypted signal to the toll server device and via the toll antenna, and may selectively: receive, from the toll server device and via the toll antenna, data indicating that the transaction amount for the vehicle toll is approved, or receive, from the toll server device and via the toll antenna, data indicating that the transaction amount for the vehicle toll is not approved.

According to some implementations, a non-transitory computer-readable medium may store one or more instructions that, when executed by one or more processors of a toll device of a vehicle, may cause the one or more processors to provide, to a toll server device and via a toll antenna of a toll collection system, a request for a transaction amount for a vehicle toll. The one or more instructions may cause the one or more processors to receive, from the toll server device, via the toll antenna, and based on the request, a response requesting authorization for payment of the transaction amount for the vehicle toll, and to determine, based on the response, an authorization request cryptogram for payment of the transaction amount for the vehicle toll, wherein the authorization request cryptogram is determined based on transaction card data identifying a transaction card associated with a transaction account. The one or more instructions may cause the one or more processors to generate an encrypted signal identifying the authorization request cryptogram, the transaction card data, and a toll device identifier identifying the toll device, and to provide the encrypted signal to the toll server device and via the toll antenna. The one or more instructions may cause the one or more processors to receive, from the toll server device, and via the toll antenna, data indicating whether the transaction amount for the vehicle toll is approved.

DETAILED DESCRIPTION

Figure 1A:
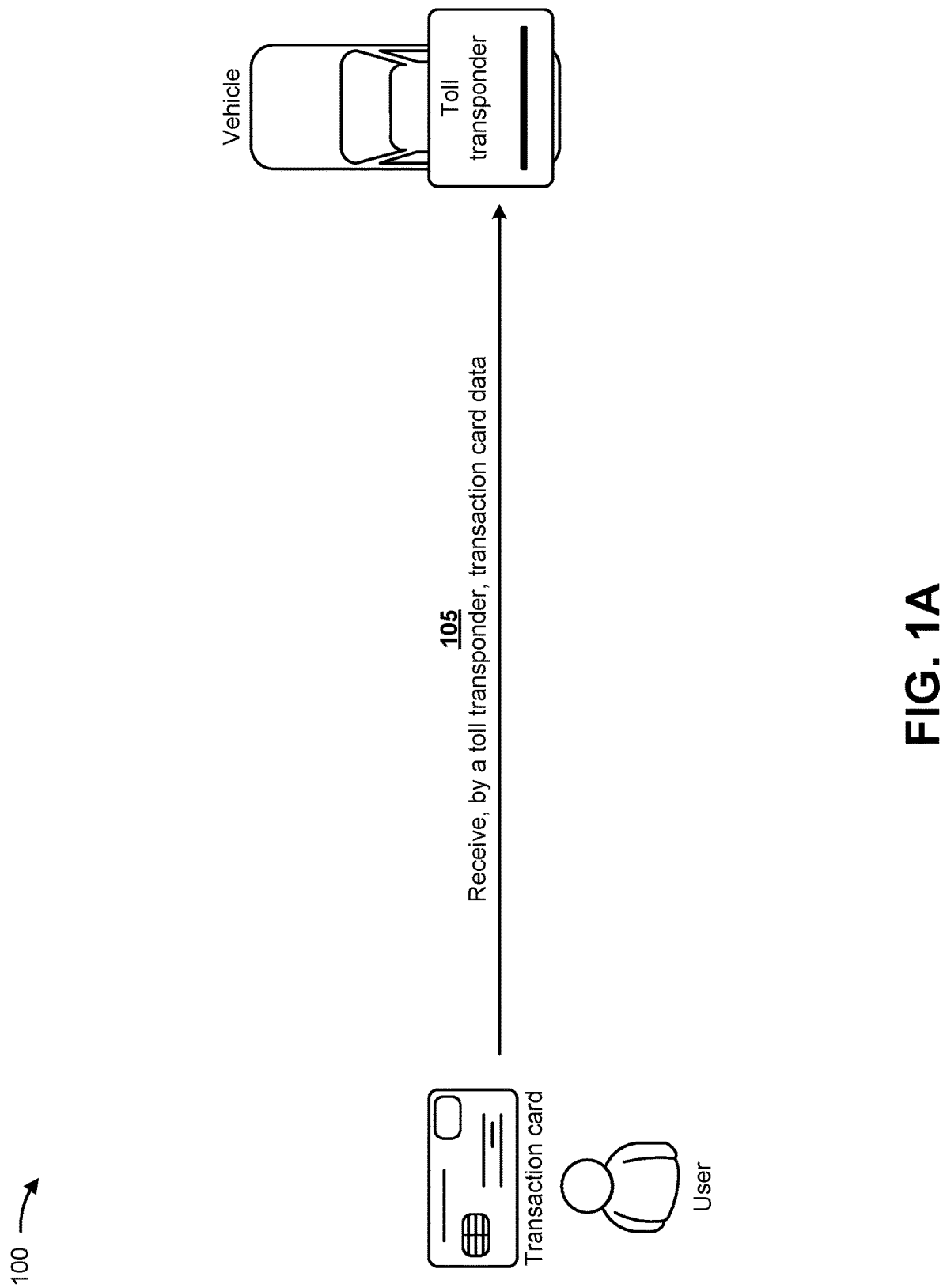
FIGS. 1A-1E are diagrams of an example implementation described herein.

The following detailed description of example implementations refers to the accompanying drawings. The same reference numbers in different drawings may identify the same or similar elements.

When a vehicle passes through a toll station, an electronic toll collection system may obtain, from a transponder in or on the vehicle, information that identifies the transponder. The electronic toll collection system may then collect a vehicle toll from a user associated with the transponder (e.g., a driver of the vehicle) by facilitating deduction of an amount of the vehicle toll from an account that was previously identified (e.g., onsite or online) by the user, such as when the user registered to participate in the electronic toll collection system.

Currently, there does not exist a safe and efficient way for the user to define, while in the vehicle (e.g., when approaching the toll station) a different account to use to pay the toll. This may prevent the user from being able to pay the toll at the toll station (e.g., when a transaction card associated with the previously identified account has expired, has been replaced, and/or the like). As a result, additional transactions may be required to be conducted (e.g., onsite or online) by the user and processed by the electronic toll collection system, such transactions associated with making a separate (e.g., one-time) payment, establishing or registering a new account, paying fines or additional fees, and/or the like. Thus, current toll collection techniques may waste computing resources (e.g., processing resources, memory resources, communication resources, and/or the like), networking resources, and/or the like associated with additional transactions required by the user and/or electronic toll collection system.

Some implementations described herein provide a toll transponder that allows a user to provide payments, for vehicle tolls, from the vehicle. For example, the toll transponder may receive transaction card data identifying a transaction card associated with a transaction account, where the transaction card data is received based on physically receiving the transaction card with the toll transponder, or a contactless communication with the transaction card. The toll transponder may provide, to a toll server device, and via a toll antenna of a toll collection system, a request for a transaction amount for a vehicle toll, and may receive, from the toll server device, via the toll antenna, and based on the request, a response requesting authorization for payment of the transaction amount for the vehicle toll. The toll transponder may determine, based on the response, an authorization request cryptogram for payment of the transaction amount for the vehicle toll, and may generate an encrypted signal identifying the authorization request cryptogram, the transaction card data, and a toll transponder identifier identifying the toll transponder. The toll transponder may provide the encrypted signal to the toll server device and via the toll antenna, and may receive, from the toll server device, and via the toll antenna, data indicating whether the transaction amount for the vehicle toll is approved.

In this way, the toll transponder enables a user to provide payments, for vehicle tolls, using a transaction card that may not be previously on file with an electronic toll collection system and/or may not be recorded by the electronic toll collection system as the preferred transaction card to be used in a current transaction. As a result, the user is able to pay for a vehicle toll even if another transaction card is on file or is recorded as the preferred transaction card, which may allow the user and/or the electronic toll collection system to avoid additional transactions such as may be associated with one-time payments, establishing a new account, paying fines or additional fees, and/or the like. This, in turn, conserves computing resources (e.g., processing resources, memory resources, communication resources, and/or the like), networking resources, and/or the like that would otherwise be wasted conducting the additional transactions.

FIGS. 1A-1E are diagrams of an example 100 associated with a vehicle toll transponder for enabling multiple transaction cards and securely providing transaction card details. As shown in FIGS. 1A-1E, example 100 may include a transaction card associated with a user, a vehicle associated with the user, and a toll transponder associated with the vehicle. The vehicle may be an automobile or other vehicle that may travel via roads, lanes, bridges, tunnels, and/or the like that are subject to vehicle tolls. The user may be a driver of the vehicle, a passenger of the vehicle, an owner of an account associated with a transaction card used to pay tolls for the vehicle, and/or the like. The toll transponder may be a device, a tag (e.g., a radio-frequency identification (RFID) tag), or other object that is configured to communicate with a toll server device in association with paying a toll, and is configured to receive a transaction card from the user in order to pay the toll, as will be described herein.

As shown in FIG. 1A, and by reference number 105, the toll transponder may receive transaction card data identifying a transaction card associated with a transaction account. For example, the toll transponder may receive the transaction card data based on receiving the transaction card or based on a contactless communication with the transaction card, as will be described herein. A user may provide the transaction card to the toll transponder before starting a drive, during a drive, when approaching a toll station, when entering a toll station, and/or the like. The transaction card may include a credit card, a debit card, or other card configured for conducting payment transactions. The transaction card data may include a transaction card number identifying the transaction card, a token identifying the transaction card, and/or a virtual number generated for the transaction card.

Figure 1B:
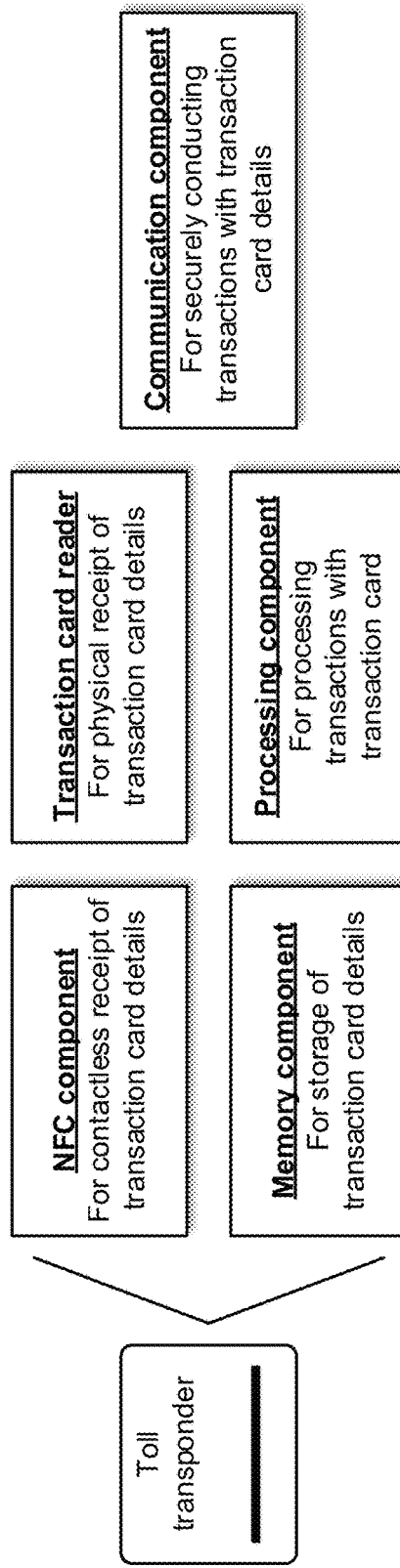

As shown in FIG. 1B, the toll transponder may include an NFC component, a transaction card reader, a memory component, a processor component, and a communication component. The NFC component may provide contactless receipt of transaction card details, such as all or a portion of the transaction card data. When receiving the transaction card data, the toll transponder may utilize the NFC component to communicate with the transaction card when the transaction card is provided within a predetermined distance from the NFC component, and may read the transaction card data based on utilizing the NFC component to communicate with the transaction card. In some implementations, a physical structure (e.g., a container, a frame, and/or the like), may be provided within the predetermined distance of the NFC component, such that the transaction card may be placed within the physical structure in order to enable the NFC component to read the transaction card data.

The transaction card reader may provide physical receipt of transaction card details, such as all or a portion of the transaction card data. When receiving the transaction card data, the toll transponder may receive and retain the transaction card data in the transaction card reader, and may read the transaction card data with the transaction card reader while retaining the transaction card in the transaction card reader. For example, the toll transponder may include a slot into which the transaction card may be inserted by the user and retained by the toll transponder. Alternatively, when receiving the transaction card data, the toll transponder may receive, temporarily, a portion of the transaction card with the transaction card reader, and may read the transaction card data from the portion of the transaction card with the transaction card reader. For example, the toll transponder may include a magnetic stripe reader through which the transaction card may be swiped by the user and read by the toll transponder.

The memory component may provide storage of transaction card details, such as all or a portion of the transaction card data. For example, the toll transponder may utilize the memory to store at least a portion of the transaction card data that was read by the toll transponder, to store data generated by the toll transponder in processing a transaction, and/or the like.

The processing component may provide processing of transactions based on the transaction card. For example, the processing component may include a microprocessor, a central processing unit (CPU), and/or the like. In some implementations, the toll transponder utilizes the processing component to generate an encrypted signal to be provided in association with paying a toll, as will be described herein.

The communication component may securely conduct transactions with the transaction card details, such as all or a portion of the transaction card data, obtained from the transaction card. For example, the communication component may include an antenna that sends and receives signals, such as radio-frequency identification (RFID) signals. In some implementations, the toll transponder may utilize the communication component to provide the encrypted signal in association with paying a toll, as will be described herein.

Figure 1C:
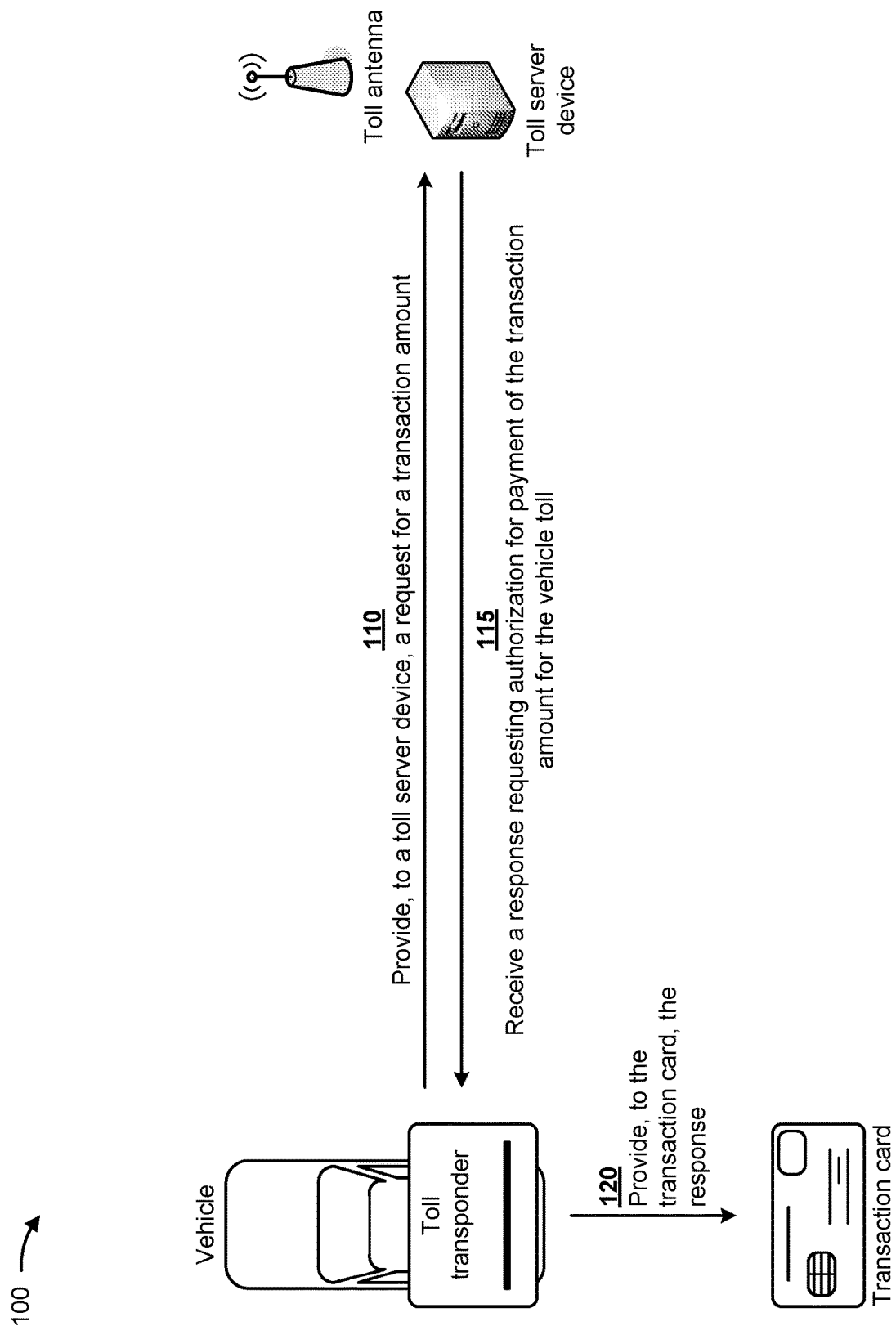

As shown in FIG. 1C, and by reference number 110, the toll transponder may provide, to a toll server device and via a toll antenna of a toll collection system, a request for a transaction amount for a vehicle toll. In some implementations, the request for the transaction amount includes a toll transponder identifier that identifies the toll transponder. The toll server device may be a central server that communicates (e.g., via one or more networks) with a number of toll stations, and also communicates (e.g., via one or more networks) with one or more financial servers to facilitate payments of tolls based on information from the toll stations, as described herein. The toll antenna may be included in a toll station (e.g., as part of a toll gantry), and may send and receive signals to and from toll transponders of vehicles that pass through the toll station. For example, when a vehicle enters a toll station, the toll antenna may pick up a signal from the toll transponder of the vehicle, and may provide a signal to notify the toll transponder that the vehicle is going through the toll station. The toll transponder may respond by sending, to the toll antenna, the request for the transaction amount for the vehicle toll, and the toll antenna may send the request for the transaction amount to the toll server device.

As further shown in FIG. 1C, and by reference number 115, the toll transponder may receive, from the toll server device, via the toll antenna, and based on the request, a response requesting authorization for payment of the transaction amount for the vehicle toll. For example, the toll server device may use the toll transponder identifier to look up information associated with the user and/or vehicle, and may determine the transaction amount based on the information associated with the user and/or vehicle. In some implementations, the transaction amount may be based on factors such as the toll station involved, a driver category, a vehicle use category, a vehicle type, a vehicle occupancy, and/or the like. The response requesting authorization for payment of the transaction amount may include the transaction amount, and may include a request to charge the transaction amount to an account associated with the transaction card.

As further shown in FIG. 1C, and by reference number 120, the toll transponder may provide, to the transaction card, the response requesting authorization for payment of the transaction amount for the vehicle toll. For example, the transaction card may have been inserted into a slot of the toll transponder, as described above, and may still be in the slot when the toll transponder provides the response requesting authorization to the transaction card. As another example, the transaction card may have been placed in proximity of an NFC reader of the toll transponder, and may still be in proximity of the NFC reader when the toll transponder provides the response requesting authorization to the transaction card.

Figure 1D:
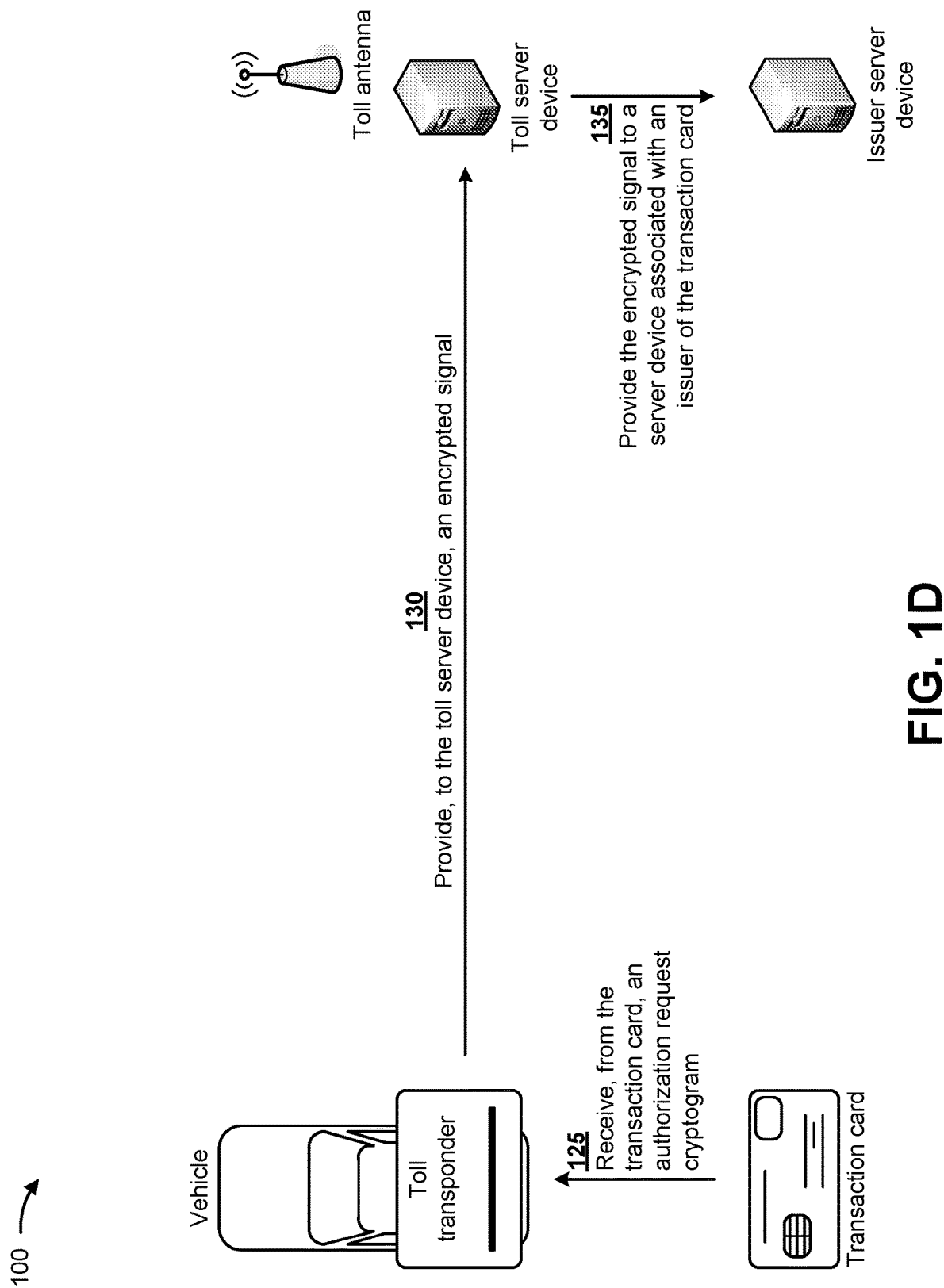

As shown in FIG. 1D, and by reference number 125, the toll transponder may receive, from the transaction card and based on the response, an authorization request cryptogram (ARQC) for payment of the transaction amount for the vehicle toll. For example, the transaction card may generate the ARQC based on the transaction card data identifying the transaction card associated with the transaction account of the user, and may provide the ARQC to the toll transponder. The ARQC may include a cryptogram of a request for authorization of an electronic transaction, and may be generated (e.g., by the transaction card) with a cryptographic key.

In some implementations, the toll transponder may determine the ARQC by providing the authorization request to the transaction card and receiving the authorization request cryptogram from the transaction card, as described above with respect to steps 120 and 125. Alternatively, the toll transponder may generate the authorization request cryptogram based on the response requesting authorization and based on the transaction card data that has been read by the toll transponder and stored by the toll transponder.

As further shown in FIG. 1D, and by reference number 130, the toll transponder may provide, to the toll server device and via the toll antenna, an encrypted signal identifying the ARQC, a toll transponder identifier, and a transaction card number. Alternatively, rather than identifying the transaction card number, the encrypted signal may identify a token identifying the transaction card, and/or a virtual number generated for the transaction card. In this way, the toll transponder may provide additional security to protect the transaction card number from being intercepted and discovered by unintended parties.

In some implementations, the communication component of the toll transponder provides the encrypted signal to the toll server device (e.g., via the toll antenna). For example, the communication component may include a radio-frequency identification (RFID) component that provides the encrypted signal as an RFID signal. In some implementations, only the ARQC of the encrypted signal may be encrypted. Alternatively, the toll transponder may encrypt (e.g., using a cryptographic key) all contents and/or other contents of the encrypted signal (e.g., the transaction card number, token, and/or virtual number) before providing the encrypted signal to the toll server device, and may thereby provide additional security to protect the contents from being intercepted and discovered by unintended parties.

As further shown in FIG. 1D, and by reference number 135, the toll server device may provide the encrypted signal to an issuer server device associated with an issuer of the transaction card. If transaction card data (e.g., the transaction card number, token, and/or virtual number) was encrypted by the toll transponder, the toll server device may decrypt the transaction card data (e.g., using a cryptographic key corresponding to the cryptographic key used by the toll transponder to encrypt the transaction card data). The toll server device may identify the issuer (e.g., an issuing financial institution that issued the transaction card) based on the transaction card data, and may provide the encrypted signal (or a portion of the encrypted signal) to the issuer server device associated with the issuer. Upon receiving the encrypted signal, the issuer server device may authorize the payment of the vehicle toll and/or facilitate a transfer of funds between an account of a cardholder of the transaction card and an account of an entity associated with the electronic toll collection system.

Figure 1E:
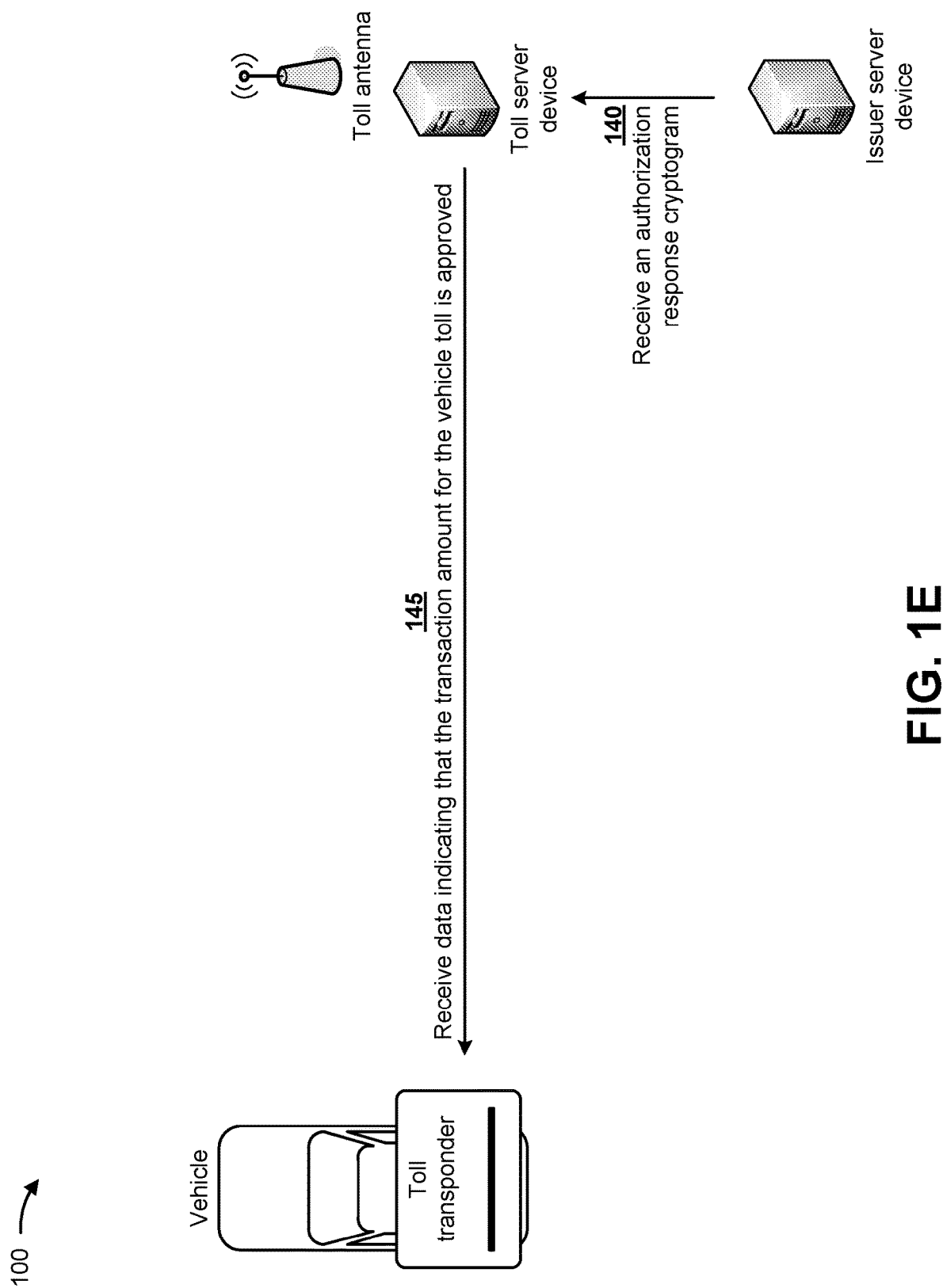

As shown in FIG. 1E, and by reference number 140, the toll server device may receive, from the issuer server device, an authorization response cryptogram (ARPC) authorizing the transaction amount. Alternatively, the server device may receive, from the issuer server device, an ARPC that does not authorize the transaction amount. The ARPC may include a cryptogram of an authorization response to the request for authorization of the electronic transaction included in the ARQC. In some implementations, the issuer server device generates the ARQC (e.g., using a cryptographic key) based on determining to authorize or not authorize the transaction amount, and provides the ARQC to the toll server device.

As further shown in FIG. 1E, and by reference number 145, the toll transponder may receive, from the toll server device and via the toll antenna, data indicating that the transaction amount for the vehicle toll is approved (if the transaction was authorized by the issuer server device), or data indicating that the transaction amount for the vehicle toll is not approved (if the transaction was not authorized by the issuer server device). In some implementations, the user may receive a notification, based on the data indicating that the transaction amount for the vehicle toll is approved or not approved, via the toll transponder. For example, the toll transponder may play a sound, illuminate a light, display a message on a display, and/or the like, indicating that the toll was approved or not approved. Additionally, or alternatively, the user may receive a notification, based on the data indicating that the transaction amount for the vehicle toll is approved or not approved, via a visual indicator. For example, the toll station may illuminate a light (e.g., a green light if the toll payment was approved), display a message on a display (e.g., "PAID" if the toll payment was approved), and/or the like.

In this way, the toll transponder enables a user to use a transaction card that was not previously associated with the toll transponder (e.g., is not on file with the toll server device) or designated to be used in association with the toll transponder (e.g., is not recorded by the toll server device as a preferred transaction card). For example, the user may have previously used another transaction card to pay vehicle tolls. In this case, the other transaction card may be associated with the toll transponder identifier (e.g., the toll server may have the other transaction card on file in association with the toll transponder). Based on the user providing the transaction card to the toll transponder, however, the newly provided transaction card may be utilized, instead of the other transaction card, to pay the transaction amount for the vehicle toll.

In some implementations, if the transaction card has not been used before with the toll collection system, the toll server device updates information associated with the user to include the transaction card. For example, the toll server device may automatically update files associated with the user to include the transaction card. Alternatively, the toll server device may provide a message to the user (e.g., to a cell phone or email address on file in association with the user) providing the user with the option to add the transaction card to the file. In some implementations, the toll server device may assign the transaction card to be the default transaction card for the user to be applied when paying vehicle tolls.

In this way, the toll transponder enables a user to provide payments, for vehicle tolls, using a transaction card that may not be previously on file with an electronic toll collection system and/or may not be recorded by the electronic toll collection system as the preferred transaction card to be used in a current transaction. As a result, the user is able to pay for a vehicle toll even if another transaction card is on file or is recorded as the preferred transaction card, which may allow the user and/or the electronic toll collection system to avoid additional transactions such as may be associated with one-time payments, establishing a new account, paying fines or additional fees, and/or the like. This, in turn, conserves computing resources (e.g., processing resources, memory resources, communication resources, and/or the like), networking resources, and/or the like that would otherwise be wasted conducting the additional transactions.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
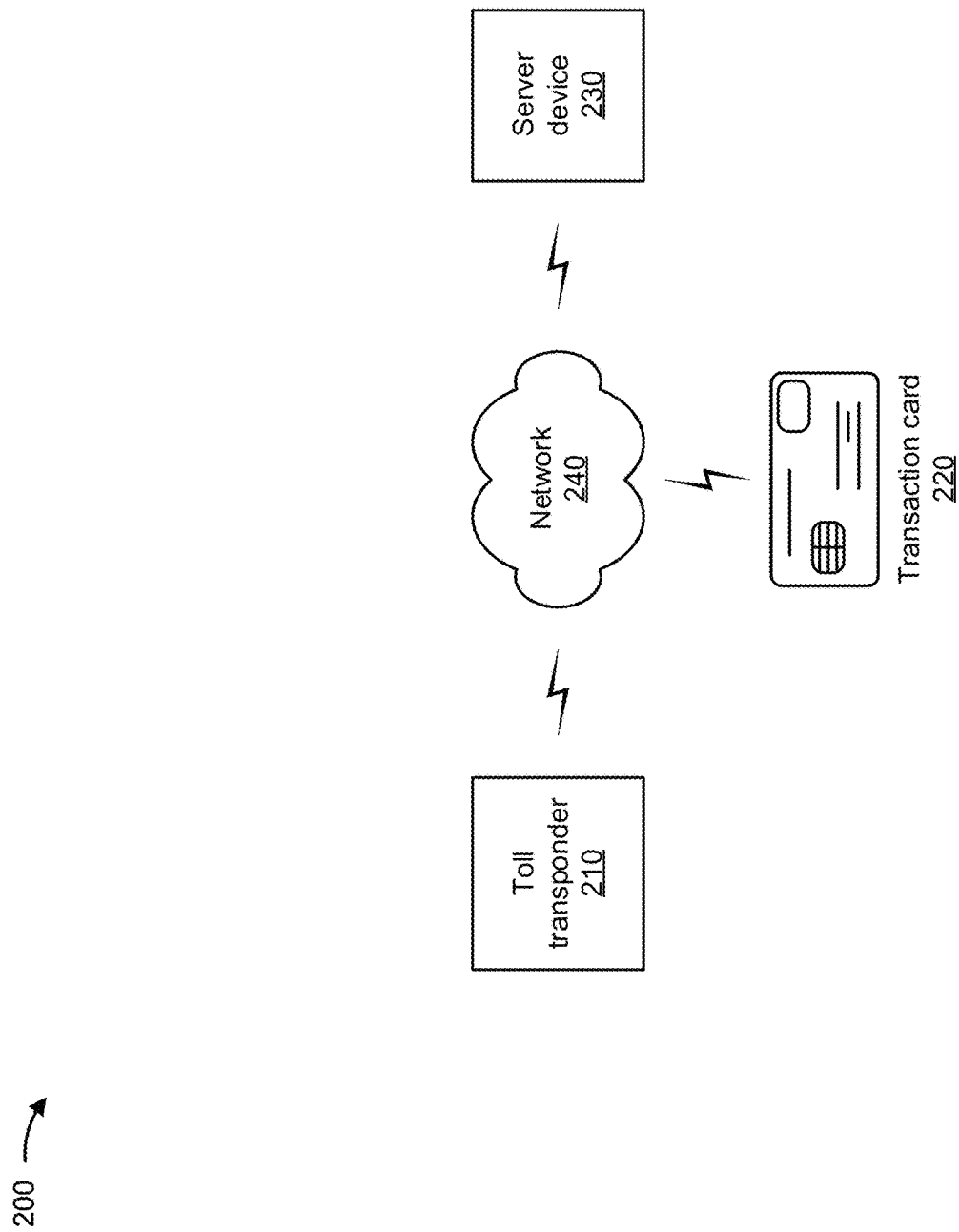
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a toll transponder 210, a transaction card 220, a server device 230, and a network 240. Devices of environment 200 may interconnect via wired connections, wireless connections, or a combination of wired and wireless connections.

Toll transponder 210 may include a transponder (e.g., a transmitter and receiver, a transceiver, and/or the like) for sending and/or receiving signals to and/or from a toll antenna. The signals may be radio-frequency identification (RFID) signals, other types of dedicated short-range communications (DRSC) signals, and/or the like. Additionally, toll transponder 210 may include one or more devices that may facilitate processing transactions via a transaction card 220, such as one or more input devices to facilitate obtaining transaction card data from transaction card 220 and/or output devices to facilitate providing transaction card data to transaction card 220. For example, an input device of toll transponder 210 may include a magnetic stripe reader, a chip reader, a near-field communication (NFC) reader, a radio frequency (RF) signal reader, and/or the like. An output device of toll transponder 210 may include a display device, a speaker, one or more light-emitting diodes (LEDs), and/or the like.

Transaction card 220 may include a transaction card capable of communicating with toll transponder 210 to facilitate payment of a toll. In some implementations, transaction card 220 may be a smart transaction card that is capable of communicating via Bluetooth communication, BLE communication, Wi-Fi communication, a NFC session, and/or the like. Transaction card 220 may be capable of communicating data for a transaction with toll transponder 210. For example, transaction card 220 may include a magnetic strip and/or an integrated circuit (IC) chip (e.g., a EUROPAY®, MASTERCARD®, VISA® (EMV) chip) that provides transaction card data to toll transponder 210. Such an interaction may include transaction card 220 being swiped through a magnetic card reader element of toll transponder 210, being inserted into toll transponder 210 (e.g., into a card reader device of toll transponder 210) such that the IC is aligned or in contact with a chip reader of toll transponder 210, and/or the like. Transaction card 220 may include a radio frequency (RF) antenna to communicate (e.g., via NFC) transaction card information associated with transaction card 220. The RF antenna may be a passive RF antenna, an active RF antenna, and/or a battery-assisted RF antenna.

Server device 230 includes one or more devices capable of receiving, generating, storing, processing, providing, and/ or routing information associated with facilitating and processing payments for tolls in an electronic toll collection system, as described elsewhere herein. Server device 230 may include a communication device and/or a computing device, and may communicate with one or more other devices of environment 200. For example, the server device may include a toll server device that communicates (e.g., via a network) with toll stations that communicate (e.g., via a toll antenna) with transponders of vehicles in association with tolls to be paid by users of the vehicles, as described herein. Additionally, the toll server device may communicate (e.g., via a network) with financial servers (e.g., in association with payment of the vehicle tolls). Such a financial server device may include an issuer server device that processes the payment, as described herein. For example, the issuer server device may include one or more devices associated with banks and/or transaction card associations that authorize transactions and/or facilitate a transfer of funds or payments to effectuate payment of a vehicle toll.

Network 240 includes one or more wired and/or wireless networks. For example, the network 240 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
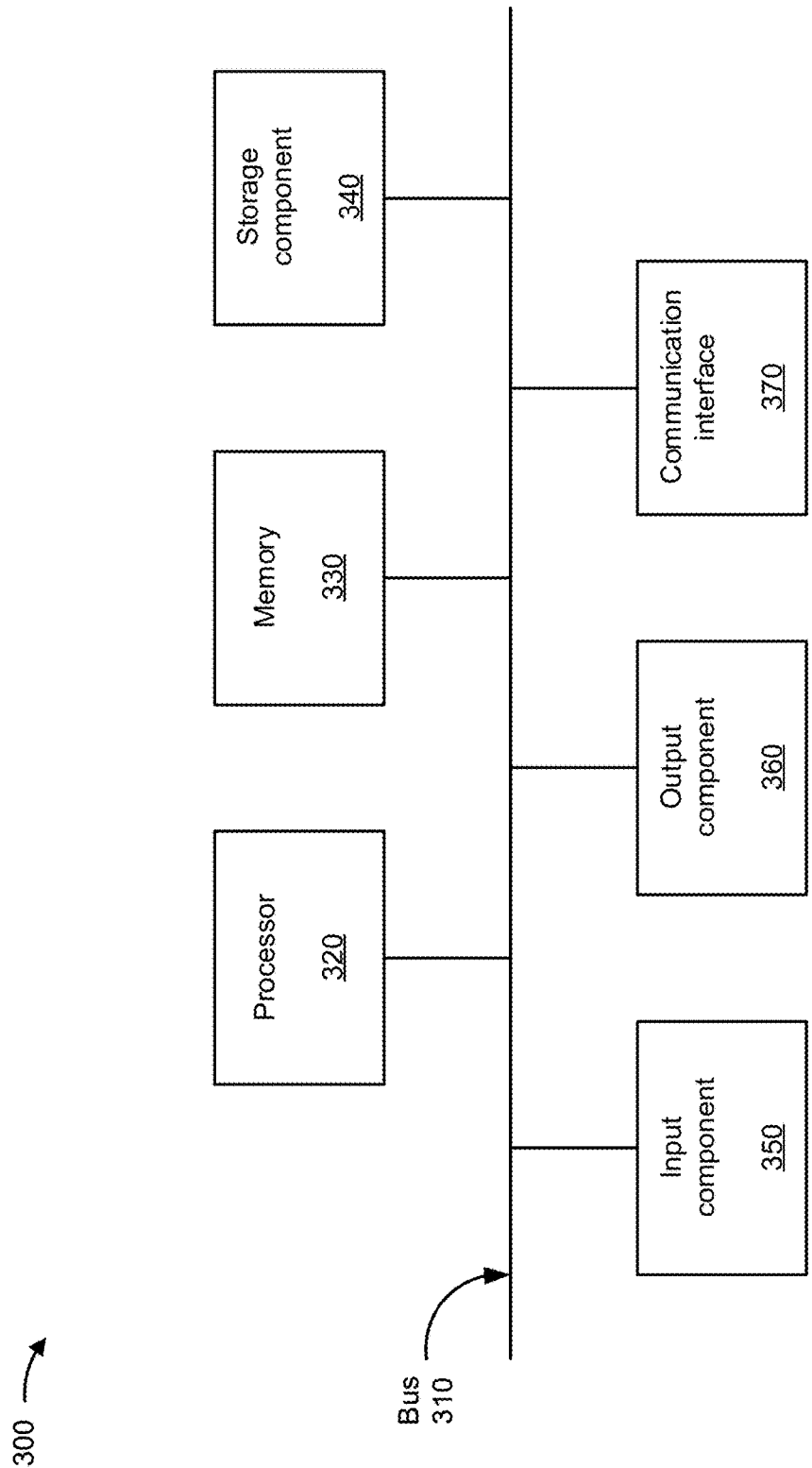
FIG. 3 is a diagram of example components of one or more devices of FIG. 2.

FIG. 3 is a diagram of example components of a device 300, which may correspond to toll transponder 210, transaction card 220, and/or server device 230. In some implementations, toll transponder 210, transaction card 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication interface 370 enables device 300 to communicate with other devices, such as via a wired connection and/or a wireless connection. For example, communication interface 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
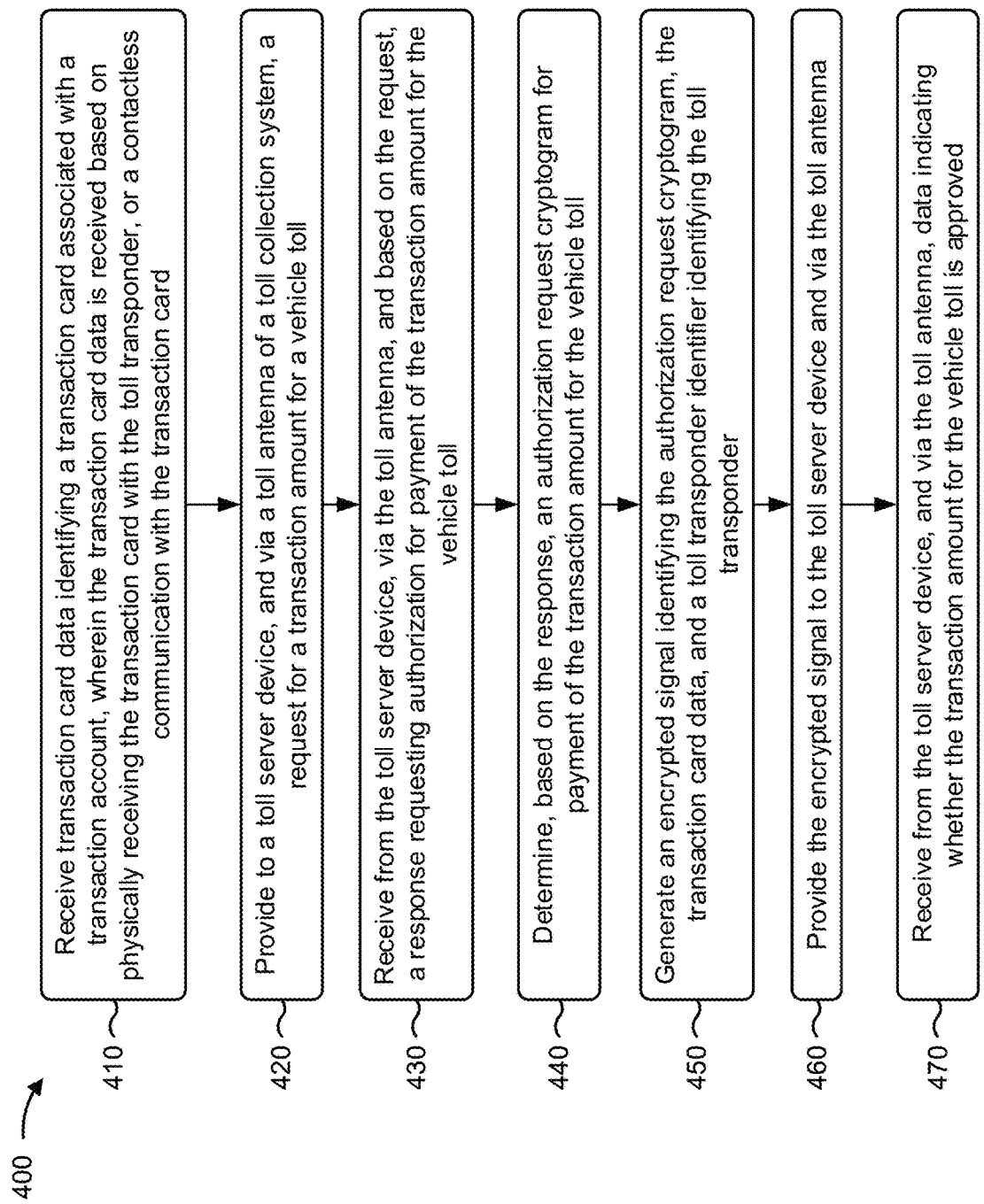
FIGS. 4-6 are flow charts of example processes relating to a vehicle toll transponder for enabling multiple transaction cards and securely providing transaction card details.

FIG. 4 is a flow chart of an example process 400 associated with a vehicle toll transponder for enabling multiple transaction cards and securely providing transaction card details. In some implementations, one or more process blocks of FIG. 4 may be performed by a toll transponder (e.g., toll transponder 210). In some implementations, one or more process blocks of FIG. 4 may be performed by another device or a group of devices separate from or including the toll transponder, such as a transaction card (e.g., transaction card 220), a server device (e.g., server device 230), and/or the like. Additionally, or alternatively, one or more process blocks of FIG. 4 may be performed by one or more components of a device 300, such as processor 320, memory 330, storage component 340, input component 350, output component 360, communication interface 370, and/or the like.

As shown in FIG. 4, process 400 may include receiving transaction card data identifying a transaction card associated with a transaction account (block 410). For example, the toll transponder may receive transaction card data identifying a transaction card associated with a transaction account, as described above. In some implementations, the transaction card data is received based on physically receiving the transaction card with the toll transponder, or a contactless communication with the transaction card.

As further shown in FIG. 4, process 400 may include providing to a toll server device, and via a toll antenna of a toll collection system, a request for a transaction amount for a vehicle toll (block 420). For example, the toll transponder may provide to a toll server device, and via a toll antenna of a toll collection system, a request for a transaction amount for a vehicle toll, as described above.

As further shown in FIG. 4, process 400 may include receiving from the toll server device, via the toll antenna, and based on the request, a response requesting authorization for payment of the transaction amount for the vehicle toll (block 430). For example, the toll transponder may receive from the toll server device, via the toll antenna, and based on the request, a response requesting authorization for payment of the transaction amount for the vehicle toll, as described above.

As further shown in FIG. 4, process 400 may include determining, based on the response, an authorization request cryptogram for payment of the transaction amount for the vehicle toll (block 440). For example, the toll transponder may determine, based on the response, an authorization request cryptogram for payment of the transaction amount for the vehicle toll, as described above.

As further shown in FIG. 4, process 400 may include generating an encrypted signal identifying the authorization request cryptogram, the transaction card data, and a toll transponder identifier identifying the toll transponder (block 450). For example, the toll transponder may generate an encrypted signal identifying the authorization request cryptogram, the transaction card data, and a toll transponder identifier identifying the toll transponder, as described above.

As further shown in FIG. 4, process 400 may include providing the encrypted signal to the toll server device and via the toll antenna (block 460). For example, the toll transponder may provide the encrypted signal to the toll server device and via the toll antenna, as described above.

As further shown in FIG. 4, process 400 may include receiving from the toll server device, and via the toll antenna, data indicating whether the transaction amount for the vehicle toll is approved (block 470). For example, the toll transponder may receive from the toll server device, and via the toll antenna, data indicating whether the transaction amount for the vehicle toll is approved, as described above.

Process 400 may include additional implementations, such as any single implementation or any combination of implementations described below and/or in connection with one or more other processes described elsewhere herein.

In a first implementation, determining the authorization request cryptogram for payment of the transaction amount for the vehicle toll comprises: providing, to the transaction card, the response requesting authorization for payment of the transaction amount for the vehicle toll, and receiving, from the transaction card and based on the response, the authorization request cryptogram for payment of the transaction amount for the vehicle toll.

In a second implementation, alone or in combination with the first implementation, receiving the data indicating whether the transaction amount for the vehicle toll is approved comprises one of: receiving data indicating that the transaction amount for the vehicle toll is approved via the toll transponder; or receiving data indicating that the transaction amount for the vehicle toll is approved via a visual indicator.

In a third implementation, alone or in combination with one or more of the first and second implementations, the encrypted signal causes the toll server device to provide the encrypted signal to an issuer server device associated with an issuer of the transaction card, and to receive, from the issuer server device, an authorization response cryptogram indicating whether the transaction amount for the vehicle toll is approved.

In a fourth implementation, alone or in combination with one or more of the first through third implementations, another transaction card is associated with the toll transponder identifier but is not utilized for the transaction amount for the vehicle toll.

In a fifth implementation, alone or in combination with one or more of the first through fourth implementations, the toll transponder includes a transaction card reader, and receiving the transaction card data comprises: receiving and retaining the transaction card in the transaction card reader, and reading the transaction card data with the transaction card reader while retaining the transaction card in the transaction card reader.

In a sixth implementation, alone or in combination with one or more of the first through fifth implementations, the toll transponder includes a processing component, and generating the encrypted signal identifying the authorization request cryptogram, the transaction card data, and the toll transponder identifier comprises utilizing the processing component to generate the encrypted signal.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
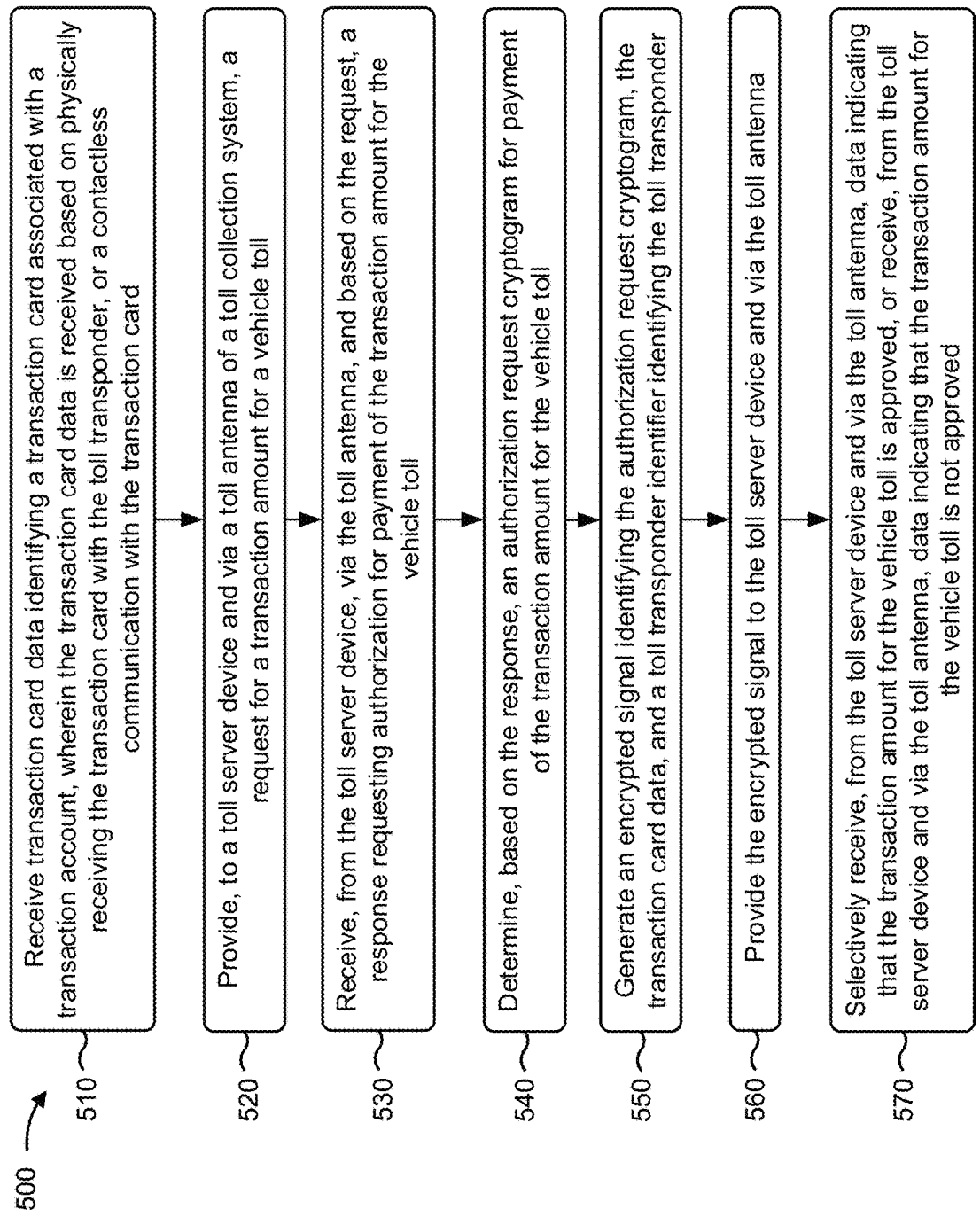

FIG. 5 is a flow chart of an example process 500 associated with a vehicle toll transponder for enabling multiple transaction cards and securely providing transaction card details. In some implementations, one or more process blocks of FIG. 5 may be performed by a toll transponder (e.g., toll transponder 210). In some implementations, one or more process blocks of FIG. 4 may be performed by another device or a group of devices separate from or including the toll transponder, such as a transaction card (e.g., transaction card 220), a server device (e.g., server device 230), and/or the like. Additionally, or alternatively, one or more process blocks of FIG. 5 may be performed by one or more components of a device 300, such as processor 320, memory 330, storage component 340, input component 350, output component 360, communication interface 370, and/or the like.

As shown in FIG. 5, process 500 may include receiving transaction card data identifying a transaction card associated with a transaction account (block 510). For example, the toll transponder may receive transaction card data identifying a transaction card associated with a transaction account, as described above. In some implementations, the transaction card data is received based on physically receiving the transaction card with the toll transponder, or a contactless communication with the transaction card.

As further shown in FIG. 5, process 500 may include providing, to a toll server device and via a toll antenna of a toll collection system, a request for a transaction amount for a vehicle toll (block 520). For example, the toll transponder may provide, to a toll server device and via a toll antenna of a toll collection system, a request for a transaction amount for a vehicle toll, as described above.

As further shown in FIG. 5, process 500 may include receiving, from the toll server device, via the toll antenna, and based on the request, a response requesting authorization for payment of the transaction amount for the vehicle toll (block 530). For example, the toll transponder may receive, from the toll server device, via the toll antenna, and based on the request, a response requesting authorization for payment of the transaction amount for the vehicle toll, as described above.

As further shown in FIG. 5, process 500 may include determining, based on the response, an authorization request cryptogram for payment of the transaction amount for the vehicle toll (block 540). For example, the toll transponder may determine, based on the response, an authorization request cryptogram for payment of the transaction amount for the vehicle toll, as described above.

As further shown in FIG. 5, process 500 may include generating an encrypted signal identifying the authorization request cryptogram, the transaction card data, and a toll transponder identifier identifying the toll transponder (block 550). For example, the toll transponder may generate an encrypted signal identifying the authorization request cryptogram, the transaction card data, and a toll transponder identifier identifying the toll transponder, as described above.

As further shown in FIG. 5, process 500 may include providing the encrypted signal to the toll server device and via the toll antenna (block 560). For example, the toll transponder may provide the encrypted signal to the toll server device and via the toll antenna, as described above.

As further shown in FIG. 5, process 500 may include selectively receiving, from the toll server device and via the toll antenna, data indicating that the transaction amount for the vehicle toll is approved, or receiving, from the toll server device and via the toll antenna, data indicating that the transaction amount for the vehicle toll is not approved (block 570). For example, the toll transponder may selectively receive, from the toll server device and via the toll antenna, data indicating that the transaction amount for the vehicle toll is approved, or receive, from the toll server device and via the toll antenna, data indicating that the transaction amount for the vehicle toll is not approved, as described above.

Process 500 may include additional implementations, such as any single implementation or any combination of implementations described below and/or in connection with one or more other processes described elsewhere herein.

In a first implementation, process 500 includes a near-field communication component, utilizing the near-field communication component to communicate with the transaction card when the transaction card is provided within a predetermined distance from the near-field communication component; and In a second implementation, alone or in combination with the first implementation, process 500 includes receiving, from the transaction card and based on the response, the authorization request cryptogram for payment of the transaction amount for the vehicle toll.

In a third implementation, alone or in combination with one or more of the first and second implementations, the transaction card data includes one or more of: a transaction card number identifying the transaction card, a token identifying the transaction card, or a virtual number generated for the transaction card.

In a fourth implementation, alone or in combination with one or more of the first through third implementations, process 500 includes receiving, temporarily, a portion of the transaction card with the transaction card reader; and reading the transaction card data from the portion of the transaction card with the transaction card reader.

In a fifth implementation, alone or in combination with one or more of the first through fourth implementations, process 500 includes a communication component that provides the encrypted signal to the toll server device and via the toll antenna.

In a sixth implementation, alone or in combination with one or more of the first through fifth implementations, process 500 includes a radio-frequency identification (RFID) component that provides the encrypted signal, via an RFID signal, to the toll server device and via the toll antenna.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
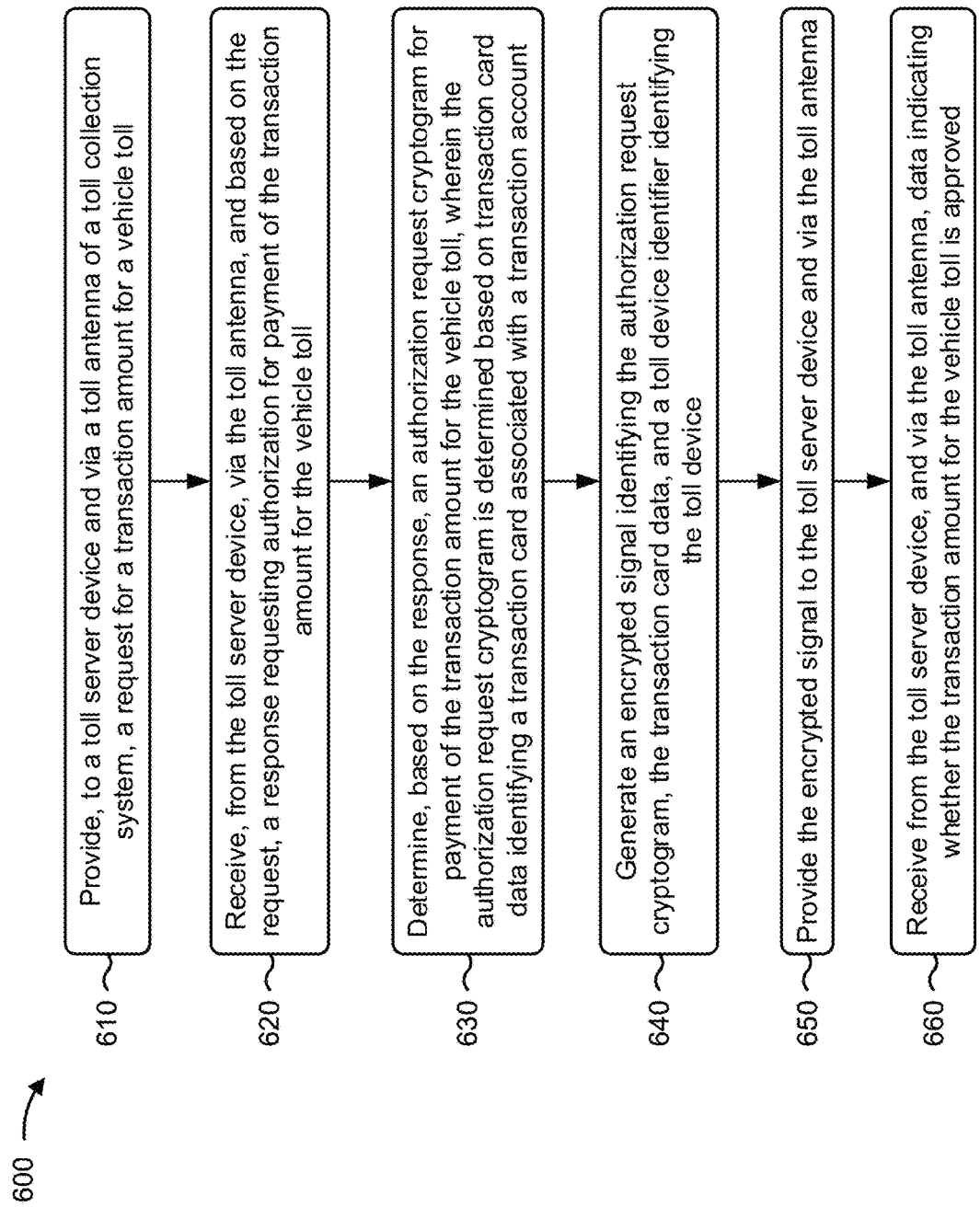

FIG. 6 is a flow chart of an example process 600 associated with a vehicle toll transponder for enabling multiple transaction cards and securely providing transaction card details. In some implementations, one or more process blocks of FIG. 6 may be performed by a toll device such as a toll transponder (e.g., toll transponder 210). In some implementations, one or more process blocks of FIG. 4 may be performed by another device or a group of devices separate from or including the toll transponder, such as a transaction card (e.g., transaction card 220), a server device (e.g., server device 230), and/or the like. Additionally, or alternatively, one or more process blocks of FIG. 6 may be performed by one or more components of a device 300, such as processor 320, memory 330, storage component 340, input component 350, output component 360, communication interface 370, and/or the like.

As shown in FIG. 6, process 600 may include providing, to a toll server device and via a toll antenna of a toll collection system, a request for a transaction amount for a vehicle toll (block 610). For example, the toll transponder may provide, to a toll server device and via a toll antenna of a toll collection system, a request for a transaction amount for a vehicle toll, as described above.

As further shown in FIG. 6, process 600 may include receiving, from the toll server device, via the toll antenna, and based on the request, a response requesting authorization for payment of the transaction amount for the vehicle toll (block 620). For example, the toll transponder may receive, from the toll server device, via the toll antenna, and based on the request, a response requesting authorization for payment of the transaction amount for the vehicle toll, as described above.

As further shown in FIG. 6, process 600 may include determining, based on the response, an authorization request cryptogram for payment of the transaction amount for the vehicle toll, wherein the authorization request cryptogram is determined based on transaction card data identifying a transaction card associated with a transaction account (block 630). For example, the toll transponder may determine, based on the response, an authorization request cryptogram for payment of the transaction amount for the vehicle toll, as described above. In some implementations, the authorization request cryptogram is determined based on transaction card data identifying a transaction card associated with a transaction account.

As further shown in FIG. 6, process 600 may include generating an encrypted signal identifying the authorization request cryptogram, the transaction card data, and a toll device identifier identifying the toll device (block 640). For example, the toll transponder may generate an encrypted signal identifying the authorization request cryptogram, the transaction card data, and a toll device identifier identifying the toll device, as described above.

As further shown in FIG. 6, process 600 may include providing the encrypted signal to the toll server device and via the toll antenna (block 650). For example, the toll transponder may provide the encrypted signal to the toll server device and via the toll antenna, as described above.

As further shown in FIG. 6, process 600 may include receiving from the toll server device, and via the toll antenna, data indicating whether the transaction amount for the vehicle toll is approved (block 660). For example, the toll transponder may receive from the toll server device, and via the toll antenna, data indicating whether the transaction amount for the vehicle toll is approved, as described above.

Process 600 may include additional implementations, such as any single implementation or any combination of implementations described below and/or in connection with one or more other processes described elsewhere herein.

In a first implementation, process 600 includes receiving, from the transaction card and based on the response, the authorization request cryptogram for payment of the transaction amount for the vehicle toll.

In a second implementation, alone or in combination with the first implementation, receiving the data indicating whether the transaction amount for the vehicle toll is approved comprises: receiving data indicating that the transaction amount for the vehicle toll is approved via the toll device; or receiving data indicating that the transaction amount for the vehicle toll is approved via a visual indicator.

In a third implementation, alone or in combination with one or more of the first and second implementations, process 600 includes receiving the transaction card data based on physical receipt of the transaction card with the toll device, or receiving the transaction card data based a contactless communication with the transaction card.

In a fourth implementation, alone or in combination with one or more of the first through third implementations, the toll device includes a transaction card reader, and process 600 includes: receiving, temporarily, a portion of the transaction card with the transaction card reader, and reading the transaction card data from the portion of the transaction card with the transaction card reader.

In a fifth implementation, alone or in combination with one or more of the first through fourth implementations, the toll device includes a near-field communication component, and process 600 includes: utilizing the near-field communication component to communicate with the transaction card when the transaction card is provided within a predetermined distance from the near-field communication component, and reading the transaction card data based on utilizing the near-field communication component to communicate with the transaction card.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a toll transponder, transaction card data identifying a transaction card associated with a transaction account,
     wherein the transaction card data is received by a transaction card reader of the toll transponder or a near-field communication reader of the toll transponder based on:
       physically receiving the transaction card with the toll transponder in association with the transaction card reader of the toll transponder, or
       a contactless communication with the transaction card in association with the near-field communication reader of the toll transponder;
   providing, by a communication component of the toll transponder, to a toll server device, and via a toll antenna of a toll collection system, a request for a transaction amount for a vehicle toll;
receiving, by the communication component of the toll transponder, from the toll server device, via the toll antenna, and based on the request, a response requesting authorization for payment of the transaction amount for the vehicle toll;
generating, by a processing component of the toll transponder and based on the response and the transaction card data, an authorization request cryptogram for payment of the transaction amount for the vehicle toll;
generating, by the processing component of the toll transponder, an encrypted signal identifying the authorization request cryptogram, the transaction card data, and a toll transponder identifier identifying the toll transponder;
providing, by the communication component of the toll transponder, the encrypted signal to the toll server device and via the toll antenna; and
receiving, by the communication component of the toll transponder, from the toll server device, and via the toll antenna, data indicating whether the transaction amount for the vehicle toll is approved.

2. The method of claim 1, wherein receiving the data indicating whether the transaction amount for the vehicle toll is approved comprises one of:
receiving data indicating that the transaction amount for the vehicle toll is approved via the toll transponder; or
receiving data indicating that the transaction amount for the vehicle toll is approved via a visual indicator.

3. The method of claim 1, wherein the encrypted signal causes the toll server device to provide the encrypted signal to an issuer server device associated with an issuer of the transaction card, and to receive, from the issuer server device, an authorization response cryptogram indicating whether the transaction amount for the vehicle toll is approved.

4. The method of claim 1, wherein another transaction card is associated with the toll transponder identifier but is not utilized for the transaction amount for the vehicle toll.

5. The method of claim 1, wherein receiving the transaction card data, when the transaction card data is received by the transaction card reader, comprises:
receiving and retaining the transaction card in the transaction card reader; and
reading the transaction card data with the transaction card reader while retaining the transaction card in the transaction card reader.

6. A toll transponder, comprising:
one or more memories;
at least one of a near-field communication component or a transaction card reader; and
one or more processors, communicatively coupled to the one or more memories, configured to:
  receive transaction card data identifying a transaction card associated with a transaction account based on utilizing the at least one of the near-field communication component or the transaction card reader,
  wherein the transaction card data is received based on:
    physically receiving the transaction card with the toll transponder in association with the transaction card reader, or
    a contactless communication with the transaction card in association with the near-field communication component;
  provide, to a toll server device and via a toll antenna of a toll collection system, a request for a transaction amount for a vehicle toll;
  receive, from the toll server device, via the toll antenna, and based on the request, a response requesting authorization for payment of the transaction amount for the vehicle toll;
  generate, based on the response and the transaction card data, an authorization request cryptogram for payment of the transaction amount for the vehicle toll;
  generate an encrypted signal identifying the authorization request cryptogram, the transaction card data, and a toll transponder identifier identifying the toll transponder;
  provide the encrypted signal to the toll server device and via the toll antenna; and
  selectively:
    receive, from the toll server device and via the toll antenna, data indicating that the transaction amount for the vehicle toll is approved, or
    receive, from the toll server device and via the toll antenna, data indicating that the transaction amount for the vehicle toll is not approved.

7. The toll transponder of claim 6, wherein the at least one of the near-field communication component or the transaction card reader includes the near-field communication component,
wherein the one or more processors, when receiving the transaction card data based on utilizing the at least one of the near-field communication component, are configured to:
  utilize the near-field communication component to communicate with the transaction card when the transaction card is provided within a predetermined distance from the near-field communication component; and
  read the transaction card data based on utilizing the near-field communication component to communicate with the transaction card.

8. The toll transponder of claim 6, wherein the transaction card data includes one or more of:
a transaction card number identifying the transaction card,
a token identifying the transaction card, or
a virtual number generated for the transaction card.

9. The toll transponder of claim 6, wherein the at least one of the near-field communication component or the transaction card reader includes the transaction card reader,
wherein the one or more processors, when receiving the transaction card data based on utilizing the transaction card reader, are configured to:
  receive, temporarily, a portion of the transaction card with the transaction card reader; and
  read the transaction card data from the portion of the transaction card with the transaction card reader.

10. The toll transponder of claim 6, further comprising:
a communication component that provides the encrypted signal to the toll server device and via the toll antenna.

11. The toll transponder of claim 6, further comprising:
a radio-frequency identification (RFID) component that provides the encrypted signal, via an RFID signal, to the toll server device and via the toll antenna.

12. A non-transitory computer-readable medium storing instructions, the instructions comprising:
one or more instructions that, when executed by one or more processors of a toll device of a vehicle, cause the one or more processors to:

provide, by a communication component of the toll device, to a toll server device, and via a toll antenna of a toll collection system, a request for a transaction amount for a vehicle toll;

receive, by the communication component of the toll device, from the toll server device, via the toll antenna, and based on the request, a response requesting authorization for payment of the transaction amount for the vehicle toll;

generate, based on the response, an authorization request cryptogram for payment of the transaction amount for the vehicle toll,
wherein the authorization request cryptogram is generated based on transaction card data identifying a transaction card associated with a transaction account;

generate an encrypted signal identifying the authorization request cryptogram, the transaction card data, and a toll device identifier identifying the toll device;

provide, by the communication component of the toll device, the encrypted signal to the toll server device and via the toll antenna; and receive, by the communication component of the toll device, from the toll server device, and via the toll antenna, data indicating whether the transaction amount for the vehicle toll is approved.

13. The non-transitory computer-readable medium of claim 12, wherein the one or more instructions, that cause the one or more processors to receive the data indicating whether the transaction amount for the vehicle toll is approved, cause the one or more processors to one of:
receive data indicating that the transaction amount for the vehicle toll is approved via the toll device; or
receive data indicating that the transaction amount for the vehicle toll is approved via a visual indicator.

14. The non-transitory computer-readable medium of claim 12, wherein the instructions further comprise:
one or more instructions that, when executed by the one or more processors, cause the one or more processors to one of:
receive the transaction card data based on physical receipt of the transaction card with the toll device, or
receive the transaction card data based a contactless communication with the transaction card.

15. The non-transitory computer-readable medium of claim 12, wherein the toll device includes a transaction card reader and the instructions further comprise:
one or more instructions that, when executed by the one or more processors, cause the one or more processors to one of:
receive, temporarily, a portion of the transaction card with the transaction card reader; and
read the transaction card data from the portion of the transaction card with the transaction card reader.

16. The non-transitory computer-readable medium of claim 12, wherein the toll device includes a near-field communication component and the instructions further comprise:
one or more instructions that, when executed by the one or more processors, cause the one or more processors to one of:
utilize the near-field communication component to communicate with the transaction card when the transaction card is provided within a predetermined distance from the near-field communication component; and
read the transaction card data based on utilizing the near-field communication component to communicate with the transaction card.

17. The method of claim 1, wherein the request for the transaction amount includes the toll transponder identifier.

18. The method of claim 1, wherein the toll transponder includes the near-field communication reader, and receiving the transaction card data comprises:
utilizing the near-field communication reader to communicate with the transaction card when the transaction card is provided within a predetermined distance from the near-field communication reader; and
read the transaction card data based on utilizing the near-field communication reader to communicate with the transaction card.

19. The toll transponder of claim 6, wherein the request for the transaction amount includes the toll transponder identifier.

20. The non-transitory computer-readable medium of claim 12, wherein the request for the transaction amount includes the toll device identifier.

* * * * *